March 7, 1939.   A. D. HENDERSON   2,149,735
PHOTOSENSITIVE MEASURING INSTRUMENT
Filed July 8, 1935
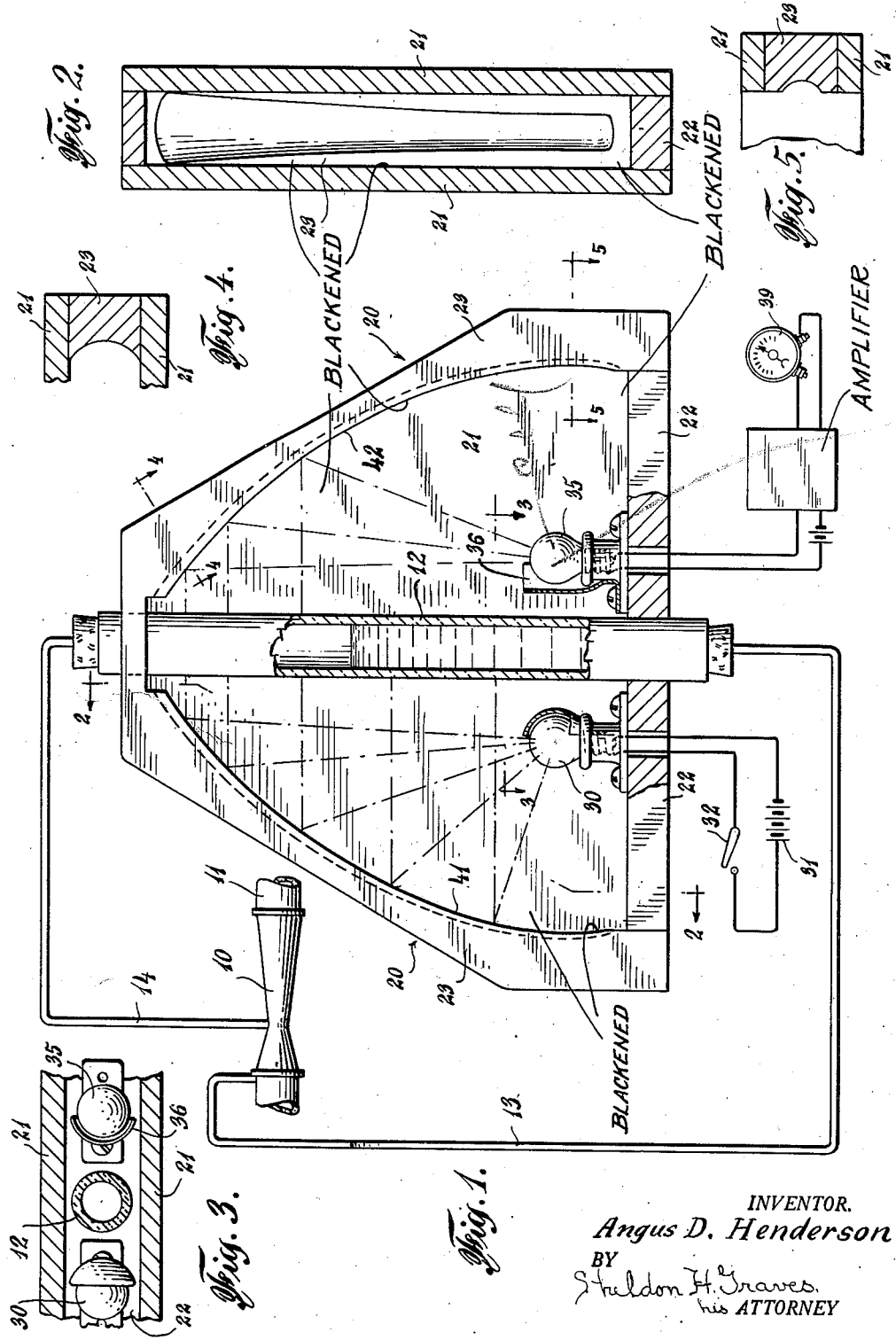
INVENTOR.
Angus D. Henderson
BY
Sheldon H. Graves.
his ATTORNEY

Patented Mar. 7, 1939

2,149,735

UNITED STATES PATENT OFFICE 2,149,735

PHOTOSENSITIVE MEASURING INSTRUMENT

Angus D. Henderson, Flushing, N. Y., assignor to Alan W. Ross, Upper Montclair, N. J.

Application July 8, 1935, Serial No. 30,312

6 Claims. (Cl. 73—290)

This invention relates to measuring instruments particularly such as embody a source of light or other radiant energy, a light responsive device and means which varies the quantity of light received by the latter, in accordance with variations in the quantity to be measured.

In the embodiment of my invention herein disclosed, I provide between the light source and the light responsive device, a glass tube adapted to contain mercury or other opaque liquid, the level of which varies in accordance with the quantity to be measured. The tube may form part of a manometer, thermometer, liquid level indicator or similar device.

One object of my invention is to provide a novel arrangement of the above mentioned elements with reflecting surfaces so formed and arranged as to permit the recording of relatively great variations of the liquid level. A further object is to provide an improved arrangement of the above described character which will make available a maximum proportion of light emitted by the source. A further object is to provide an improved means for illuminating the tube uniformly or varying according to a predetermined mathematical law throughout its length so that accurate measurement of the liquid levels may be made.

Other objects of my invention include simplicity, economy and compactness of construction and still further objects and advantages will appear from the following description taken in connection with the accompanying drawing wherein:

Figure 1 is a side elevation of the casing which contains a manometric tube, a source of light and a photoelectric cell, one side of the casing being removed to show the contents, together with a schematic arrangement for connecting the manometric tube with a Venturi tube for determining, for example, the rate of flow through the latter and also showing a schematic circuit arrangement connecting the photoelectric cell to an electrical measuring instrument:

Figures 2, 3, 4 and 5 are sectional views taken on the lines 2—2, 3—3, 4—4, and 5—5 of Figure 1 respectively.

Referring more particularly to Figure 1 of the drawing, reference character 10 represents a Venturi tube connected in a pipe 11 through which water or other fluid may be flowing and whose velocity, for example, it is desired to measure. Pipe 11 is connected to the bottom of the manometer tube 12 by a connecting pipe 13 and the top of the manometer tube is connected with a restricted portion of the Venturi tube by a pipe 14. Tube 12 is adapted to contain mercury or other opaque fluid, the level of which varies in accordance with variations in flow through the pipe 11.

The manometer tube 12 extends through a casing 20 which comprises flat sides 21 which as will be seen from Figure 1, are approximately triangular in form. The casing has a base 22 and sides and top 23 which may conveniently be made in one piece and are arch-shaped in cross section. The inner surface of this piece is formed as a reflecting surface as will be more fully described hereafter.

Mounted on the base 22 is an electric lamp 30 preferably having a spherical bulb and filament of concentrated area. Between the lamp and the tube 12 is an opaque shield to prevent the direct rays of the light reaching the tube. Current to the lamp 30 may be supplied from any suitable source such as the battery 31 in circuit with the switch 32, or from the usual power or lighting mains.

Mounted on the base 22 on the opposite side of the tube 12 is a photoelectric cell 35 having a spherical bulb and preferably of a type adapted to receive a light beam of a relatively small area such, for example, as the so-called Thiring cell having selenium between the plate electrodes.

Between the cell 35 and the tube 12 is an opaque shield 36 to prevent stray light from reaching cell 35.

The variations in current through the cell 35 serves to operate a vacuum tube amplifier 38 in the output circuit of which is a measuring instrument 39 which will be suitably calibrated to indicate, in this particular instance, the flow through the pipe 11. Where the amplifier is supplied with direct current as from a battery, this amplifier will preferably comprise a number of stages, impedance or resistance coupled to one another or similarly coupled so as to constitute a direct current amplifier.

As previously stated the inner surfaces of the archshaped piece 23 forming the sides and top of the casing 20 are made reflecting. These surfaces are parabolic in longitudinal section, the surface at the left 41 having as its focus the light emitting body in the lamp 30 and the surface 42 on the other side having as its focus the concentrated area between the electrodes of the cell 35.

I have indicated by dotted lines the paths of the rays of light from the lamp 30 to the cell 35. These paths are of the same length, the intention being to eliminate the error due to differences in distance from source to cell, to illuminate the left hand surface of the tube 12 throughout its entire length and the current passing through the cell 35 to be strictly in inverse proportion to the height of the liquid level in the tube. The surfaces 41 and 42 are curved in cross section as indicated for example in Figures 2, 4 and 5. This curvature gradually changes from top to bottom of the casing, to compensate for varying distances between the source, reflector and tube, the radius of curvature being greater at the top than at the bottom, the purpose being to concentrate the light from the reflecting surface 41 to a relatively narrow vertical line at the center of the tube so as to allow the opaque column to intercept all of the light impinging at the opaque portion of the tube. In one form of my invention the reflecting surfaces at the top are considerably wider than at the bottom so that each element of cross sectional area of the reflecting surface intercepts the same angle of light. Also the distance along which the light travels from each point on each elemental cross sectional area to the center of the tube is substantially constant. The portions of the inside of member 23 which lie to one side of the reflecting surface as well as the inner faces of the walls 21 are preferably blackened.

It will be noted here that the variation in cross-sectional width of the reflecting surface 41 may be so designed as to intercept varying angles of light from the source 30. In this manner, the narrow band of light impinging on the center of the tube will be of varying intensity and the rising or falling opaque column will produce a current through cell 35 varying in accordance with a mathematical law predetermined by the variation in width of the reflecting surface.

I wish it distinctly understood that my invention herein described and illustrated is in the form in which I desire to construct it, but that changes or variations may be made as may be convenient or desirable without departing from the salient features of my invention and I therefore intend the following claims to cover such modifications as naturally fall within the lines of my invention.

I claim:

1. In a device for measuring the level of a substantially opaque liquid in a transparent tube, the combination with such tube, a casing through which said tube passes, a parabolic reflector adjacent a wall of said casing, a source of light of small area mounted adjacent the tube between the reflector and tube and at substantially the focus of the reflector parabola, said reflector having a width which increases with increasing distance of the reflecting surface from the source of light and serving to direct the light against said tube in the form of a band of uniform intensity along its length, a shield between the source and tube and light responsive means positioned in said casing to measure the quantity of light passing through the tube in the path of light from said source and tube.

2. In a device for measuring the level of a substantially opaque liquid in a transparent tube, the combination with such tube, a casing through which said tube passes a parabolic reflector adjacent a wall of said casing, a source of light of small area mounted closely adjacent the tube between the reflector and tube and at substantially the focus of the reflector parabola, said reflector having a width which increases with increasing distance of the reflecting surface from the source of light and serving to direct the light against said tube in the form of a band of uniform intensity along its length, a reflecting shield between the source and tube and light responsive means positioned in said casing at the side of said tube opposite to said reflector to measure the quantity of light passing through the tube.

3. In a device for measuring liquid level in a transparent tube, the liquid being of such character that the parts of the tube with and without the liquid transmit light to a different degree, the combination with such tube, parabolic reflectors at opposite sides of said tube, a source of light of small area between one of the reflectors and the tube, and at the focus of said one reflector a photoelectric cell having an active element of small area located between the other reflector and the tube, said reflectors varying in width in accordance with the distances of their surfaces from the source and the photoelectric device respectively whereby the light from said source on reflection from said one reflector impinges on the tube as a band of uniform intensity and substantially all of said reflected light is received by said other reflector and by said cell.

4. In a device for measuring levels of opaque or partly opaque fluid, a container formed with a tubular passage therethrough with walls of transparent material, a source of light in said container at one side of said passage, means forming a parabolic reflecting surface at said one side and beyond said source, said surface having a width increasing with increasing distances of said surface from said source, said source being located at the focus of said parabolic surface and said surface serving to direct light to said passage in the form of a band of uniform intensity along the length thereof and means for measuring the light emerging from said passage.

5. In a device for measuring the level of an opaque or partly opaque liquid in a transparent tube, the combination with said tube, a casing through which said tube passes, parabolic reflectors at opposite walls of said casing, a source of light at the bottom of said casing and adjacent said tube and between one of the reflectors and the tube and at the focus of said one reflector, said one reflector increasing in width as the distance of the reflecting surface from the source increases and serving to direct light to said tube as a band of uniform intensity, a photoelectric cell adjacent the tube and between the other reflector and the tube and at the focus of the other reflector and shields between the lamp and cell respectively and the tube, and means for measuring variations of intensity of current through said cell.

6. In a measuring device, a container formed with a tubular passage therethrough with walls of transparent material and adapted to contain an opaque or partly opaque fluid to varying levels, a source of light in said container at one side of the said passage, means forming a parabolic reflecting surface at one side and beyond said source, said surface serving to reflect light to said passage in the form of a narrow band, said source being located at the focus of said parabolic surface and said surface having a width at different levels which is a function of the distance of said surface from said source at such level whereby the light emerging from said passage varies in accordance with a quantity to be measured and means responsive to the light emerging from said passage.

ANGUS D. HENDERSON.